US008474466B2

(12) United States Patent
Lakin

(10) Patent No.: US 8,474,466 B2
(45) Date of Patent: Jul. 2, 2013

(54) HAIR GRAPHIC CUTTING APPARATUS

(76) Inventor: Paul Willaim Charles Lakin, Worthing (GB)

( * ) Notice: Subject to any disclaimer, the term of this patent is extended or adjusted under 35 U.S.C. 154(b) by 1005 days.

(21) Appl. No.: 12/448,935

(22) Filed: Jul. 15, 2009

(65) Prior Publication Data

US 2012/0234146 A1 Sep. 20, 2012

(30) Foreign Application Priority Data

Aug. 18, 2008 (GB) .................................. 0814996.5

(51) Int. Cl.

| | |
|---|---|
| ***A45D 24/34*** | (2006.01) |
| ***A45D 24/36*** | (2006.01) |
| ***B26D 1/00*** | (2006.01) |
| ***B26D 3/00*** | (2006.01) |
| ***G09B 19/10*** | (2006.01) |
| ***B25F 3/00*** | (2006.01) |
| ***B26B 1/00*** | (2006.01) |
| ***B26B 3/00*** | (2006.01) |

(52) U.S. Cl.
USPC ............... 132/213; 132/214; 30/131; 434/94; 83/13

(58) Field of Classification Search
USPC .............. 132/213, 200, 213.1, 214, 319, 320, 132/333, 212; 119/600, 608–610; 30/131, 30/132, 201, 202, 233, 133, 123; 83/360, 83/361, 440.1, 76.1, 76.2, 76.3, 76.9, 13, 83/58, 62.1, 72, DIG. 1; 434/94; 446/296; 606/133; 74/471 XY
See application file for complete search history.

(56) References Cited

U.S. PATENT DOCUMENTS

| | | | | | |
|---|---|---|---|---|---|
| 1,192,085 | A | * | 7/1916 | Marchins | 30/198 |
| 2,480,920 | A | * | 9/1949 | Gullong | 30/202 |
| 2,752,677 | A | * | 7/1956 | Mullen | 30/202 |
| 2,972,351 | A | | 1/1959 | Morgan | |
| 3,213,864 | A | * | 10/1965 | Kennedy | 132/213 |
| 3,233,614 | A | | 2/1966 | Lefcoski | |
| 3,241,562 | A | | 3/1966 | Gronier | |
| 3,260,268 | A | * | 7/1966 | Reynolds et al. | 132/213 |
| 3,272,209 | A | | 9/1966 | Kraus | |
| 3,413,985 | A | | 12/1968 | Dlouhy et al. | |
| 3,570,500 | A | | 3/1971 | Berry | |
| 3,678,944 | A | * | 7/1972 | Berry | 132/213.1 |
| 3,979,825 | A | * | 9/1976 | Baumann | 30/133 |
| 4,070,938 | A | * | 1/1978 | Lines | 83/76.2 |

(Continued)

FOREIGN PATENT DOCUMENTS

| | | | |
|---|---|---|---|
| FR | 2658444 A3 * | 8/1991 | |
| GB | 0814996.5 | 12/2008 | |

*Primary Examiner* — Vanitha Elgart
(74) *Attorney, Agent, or Firm* — Robert C. Klinger

(57) ABSTRACT

A graphic cutting device for cutting a graphic design including a first track on which the graphic cutting device is motor-drivably slidably and transversely mounted, a second track on which the first track is motor-drivably slidably mounted, an electronic controller which automatically controls the movement of the graphic cutting device on the first track and the movement of the first track on the second track so that a selected graphic design is cut into a user's hair so as to be defined by bordering hair and so as to extend from the user's hairline and/or be spaced from the user's hairline, and an input interface which enables input of said graphic design to the controller. The input interface includes at least one of an internet connection, an electronic memory card reader, and a peripheral device connection, and the controller includes an electronic memory storage device which stores electronic movement.

10 Claims, 4 Drawing Sheets

U.S. PATENT DOCUMENTS 4,391,040 A * 7/1983 Kanazawa ...................... 30/201
4,519,037 A * 5/1985 Brodeur et al. ................. 700/90
4,602,542 A * 7/1986 Natrasevschi ................. 83/76.2
5,107,868 A * 4/1992 Aryee .......................... 132/201
5,865,192 A 2/1999 Sealy
5,931,166 A * 8/1999 Weber et al. .................... 132/73
6,326,884 B1 * 12/2001 Wohlrabe ...................... 375/259
2002/0119428 A1 * 8/2002 Vitale ............................ 434/94
2005/0216035 A1 * 9/2005 Kraus et al. ................... 606/133
2007/0265867 A1 * 11/2007 Lin .................................. 705/1
2009/0306498 A1 * 12/2009 Bodduluri et al. ............ 600/425
2010/0304339 A1 * 12/2010 Soto ............................... 434/94
2011/0018985 A1 * 1/2011 Zhu ................................ 348/61
2012/0116417 A1 * 5/2012 Bodduluri et al. ............ 606/130
2012/0158019 A1 * 6/2012 Tenney et al. ................. 606/133

* cited by examiner

HAIR GRAPHIC CUTTING APPARATUS

The present invention relates to hair graphic cutting apparatus.

BACKGROUND OF THE INVENTION

It is fashionable to have artistic graphic works shaved into one's hair. However, with more intricate and unique graphic works, this becomes expensive and time consuming, and the hairdresser has to be extremely skilled, thereby limiting availability.

The present invention seeks to provide a solution to these problems.

SUMMARY OF THE INVENTION

According to a first aspect of the invention, there is provided hair graphic cutting apparatus comprising a graphic cutting device for cutting a graphic design as hereinafter defined, a first track on which the graphic cutting device is motor-drivably slidably mounted, a second track on which the first track is motor-drivably slidably mounted, an electronic controller for automatically controlling, based on a selected graphic pattern, the movement of the graphic cutting device on the first track and the movement of the first track on the second track so that at least one of a distinct picture, pattern, emblem and logo is cut into a user's hair so as to be defined by bordering hair and so as to at least one of extend from a user's hairline and be spaced from the user's hairline, and input interface means for inputting said graphic design to the controller, the input interface means including at least one of an internet connection, a card reader, and a peripheral device connection, wherein the controller includes a memory storage device for storing movement instructions for the graphic cutting device.

According to a second aspect of the invention, there is provided hair graphic cutting apparatus comprising a graphic cutting device, a first track on which the graphic cutting device is slidably mounted, a second track on which the first track is slidably mounted, a controller for controlling, based on a selected graphic pattern, the movement of the graphic cutting device on the first track and the movement of the first track on the second track, and input interface means for inputting designs to the controller, the input interface means including at least one of an internet connection, a card reader, and a peripheral device connection.

According to a third aspect of the invention, there is provided hair graphic cutting apparatus comprising a graphic cutting device for cutting a graphic design as hereinbefore defined, a first track on which the graphic cutting device is motor-drivably slidably mounted, a second track on which the first track is motor-drivably slidably mounted, and an electronic controller which automatically controls, based on a selected graphic pattern, the movement of the graphic cutting device on the first track and the movement of the first track on the second track so that at least one of a distinct picture, pattern, emblem and logo is cut into a user's hair so as to be defined at least in part by bordering hair and so as to at least one of extend from a user's hairline and be spaced from the user's hairline.

The term 'graphic' is intended to mean an artistic design or work, such as a picture, pattern, emblem and/or logo, which extends from a user's hairline and/or is spaced from the user's hairline. Such a graphic work may be a repetitious pattern and may include straight lines, curved lines, acute and obtuse corners and changes of direction, as well as varying grades of hair length.

The invention will now be more particularly described, by way of example only, with reference to the accompanying drawings.

DESCRIPTION OF THE PREFERRED EMBODIMENTS

Figure 1:
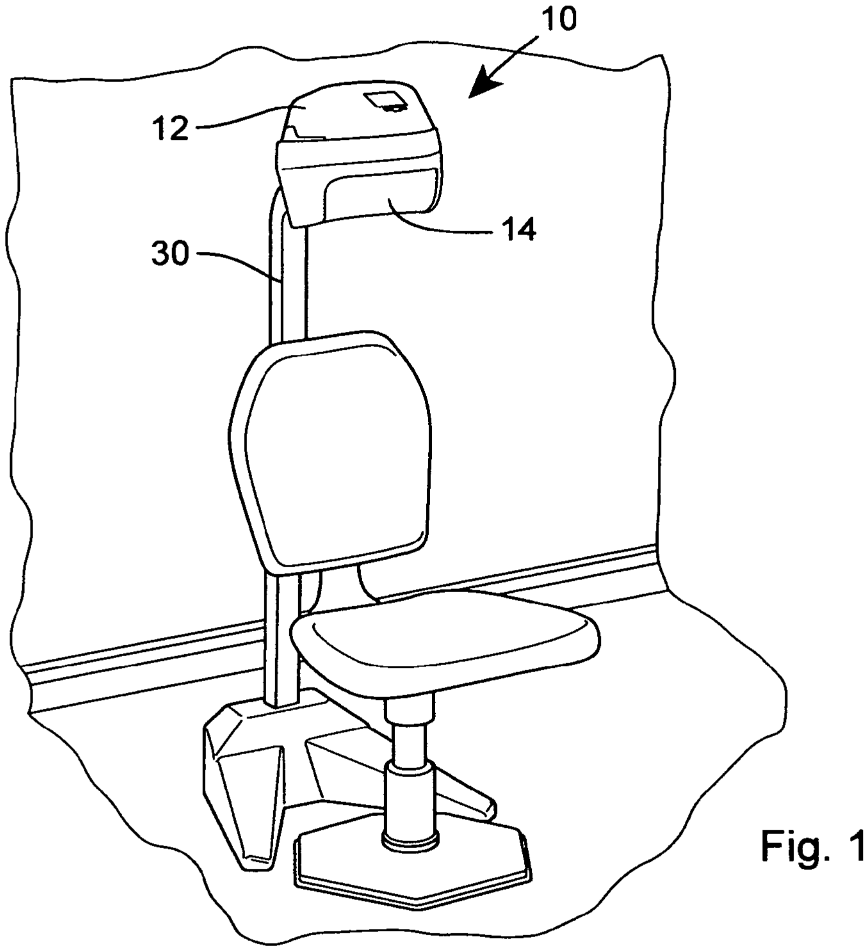
FIG. 1 shows a perspective view of a first embodiment of hair graphic cutting apparatus, in accordance with the present invention.
Figure 2:
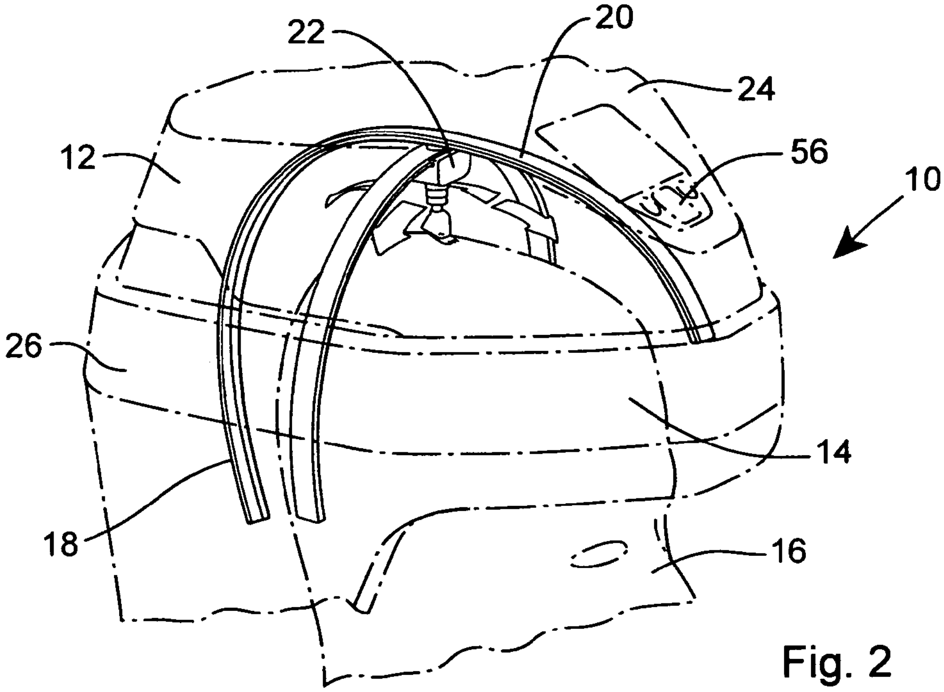
FIG. 2 shows a phantom view of a head housing of the hair graphic cutting apparatus, within which are tracks and a cutting device.
Figure 3:
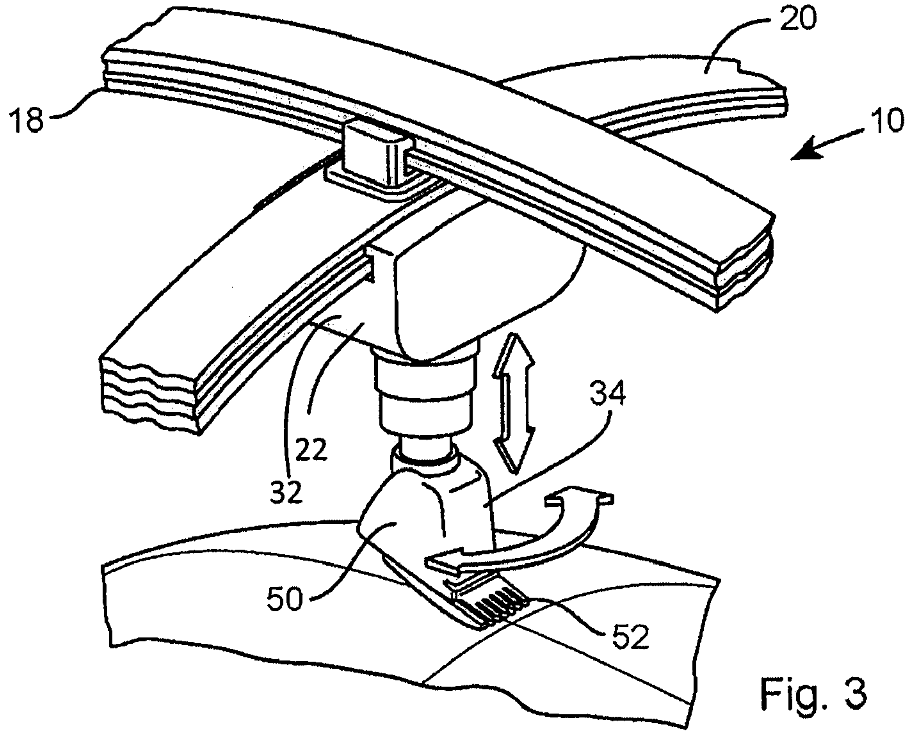
FIG. 3 shows an enlarged view of parts of the tracks and the cutting device.

Referring firstly to FIGS. 1 to 6 of the drawings, there is shown hair graphic cutting apparatus 10 which comprises a head housing 12 having a cavity 14 for a user's head 16, a fixed rail or track 18 which is fixedly mounted to a surface of the cavity 14, a movable rail or track 20 which is slidably mounted on the fixed track 18, and a graphic cutting device 22 which is slidably connected to the movable track 20.

The cavity 14 of the head housing 12 is of sufficient size to accept at least the top, rear and sides of any user's head 16, and typically extends forwardly to cover the forehead. The head housing 12 is preferably formed of upper and lower shells 24, 26, one defining the cavity 14 and the other defining the upper outer surface 28. A space defined between the two shells is sufficient to accept a controller for controlling the movable track 20 and the cutting device 22, along with associated circuitry.

The head housing 12 is preferably supported on a stand 30 which can be moved into position adjacent to a chair back. The stand 30 is typically adjustable to enable lowering and raising of the head housing 12 to accommodate a user. Alternatively, the head housing can be fixed in an upstanding adjustable manner to a chair. In either case, the chair itself may be adjustable instead of or in addition to the head housing 12.

The fixed track 18 is arcuate along its longitudinal extent, curving in the superior/inferior direction, and rectilinear in the anterior/posterior direction. However, other shapes, forms or directions may be envisaged.

The movable track 20 is also arcuate along its longitudinal extent in the superior/inferior direction, but extends transversely, preferably at right angles, to the fixed track 18, being rectilinear in the lateral direction of the head housing 12.

Each track has a fixed shape, with the movable track 20 being slidably connected to the fixed track 18 via, for example, an electric drive mechanism, such as an electric motor and belt arrangement or a worm drive.

Figure 4:
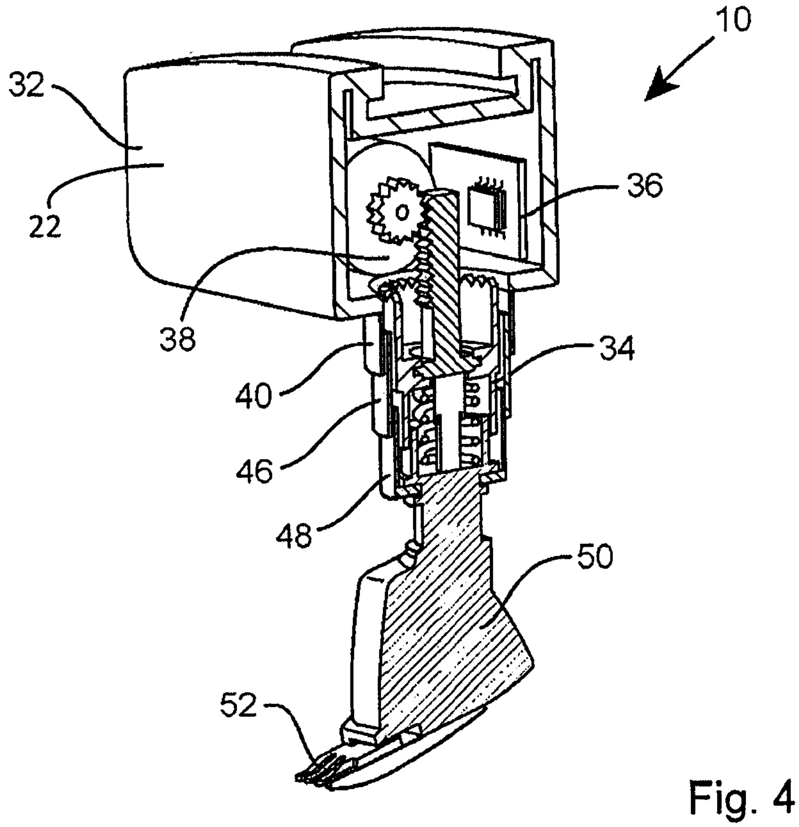
FIG. 4 shows a cross-sectional view of the cutting device, from one side.
Figure 5:
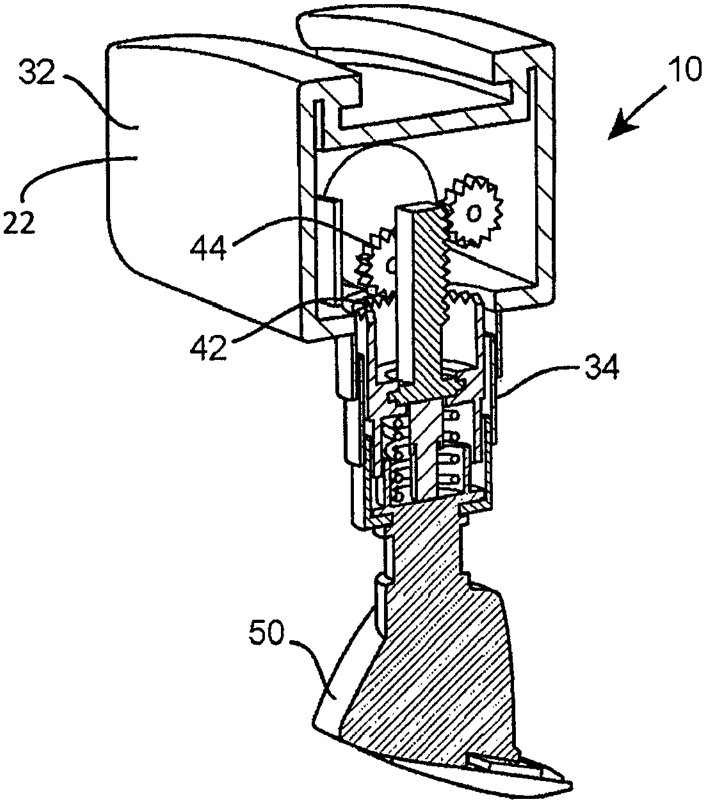
FIG. 5 shows a cross-sectional view of the cutting device, from the other side.
Figure 6:
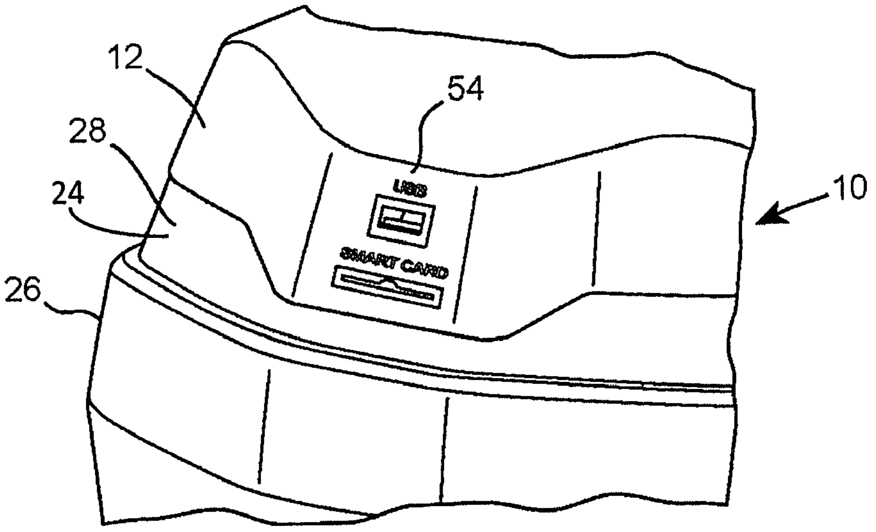
FIG. 6 is a view of a rear part of the head housing.

As best seen in FIGS. 4 and 5, the graphic cutting device 22 is slidably mounted to the movable track 20 via a track housing 32 from which a cutter 34 telescopically extends. The track housing 32 comprises a PCB 36 with local control circuitry thereon, a motor-driven rack and pinion 38 for controlling an extension of the cutter 34, and a motor-driven crown gear arrangement for controlling a rotation of the cutter 34. A further electric drive mechanism is used to move the graphic cutting device 22 along the moveable track.

In this embodiment, the cutter 34 has three sections. A main section 40 is connected for rotation with the track housing 32 and includes a crown gear 42 along its proximal edge which meshes with a spur gear 44 within the track housing 32. A middle section 46 is telescopically movable in and out of the main section 40, but angularly fixed relative thereto. A proximal section 48 is telescopically movable in and out of the middle section 46, and is also angularly fixed relative thereto. A cutting head 50 having blades 52 which are movable relative to each other is carried by the proximal section 48. The cutting head 50 is also angularly fixed relative to the main, middle and proximal sections 40, 46, 48.

A pressure sensor is included to monitor a pressure being imparted by the cutter 34. Feedback control from the pressure sensor to the control circuitry on the PCB 36 is utilised to control the extension of the cutting head 50, preventing possible injury to the user. If excessive pressure is monitored by the sensor, such as significant movement from the user's head 16, the control circuitry on the PCB 36 may shutdown the apparatus for safety purposes.

The control circuitry also locally controls the crown gear arrangement 42, 44, the cutter 34, and the movement of the cutting device on the movable track 20.

The main controller of the hair graphic cutting apparatus 10 includes an onboard memory storage device for storing a number of pre-set graphic patterns or designs.

Various input interfaces 54 are also provided for interfacing between an external source and the main controller. The input interfaces 54 can include one or more of an internet connection, being wireless and/or wired, a USB connector, and a card reader, for example for reading a flash memory card, such as an SD card. The onboard memory storage device allows uploading of graphic patterns via the input interface or interfaces 54, and access to these patterns from the memory storage device by the control circuitry of the main controller. The main controller controls the local control circuitry according to the graphic pattern required.

The main controller also includes a user interface 56, preferably on an outer surface of the head housing 12, which allows selection of a particular graphic pattern and the input of the user's head dimensions. The main controller controls the local control circuitry to set the parameters of the pressure sensor based on the inputted head dimensions, such as the hairline circumference, the anterior/posterior length via crown, and the lateral or side-to-side length via crown.

Once the graphic pattern is selected and the user's head dimensions are inputted, the user's head 16 is located in the cavity 14 of the head housing 12, and the cutting program is initiated via the user interface 56. The main controller programs the local control circuitry with the required data, the cutting head 50 is initialised, and cutting begins. All parts of the user's hair can be accessed by the graphic cutting device 22 moving on the movable track 20 and, in turn, the movable track 20 moving on the fixed track 18.

Following completion of the graphic pattern, the hairdresser removes the head housing 12 and tidies the pattern with a very fine standard handheld cutter 34, for example to sharpen any edges or corners.

Figure 7:
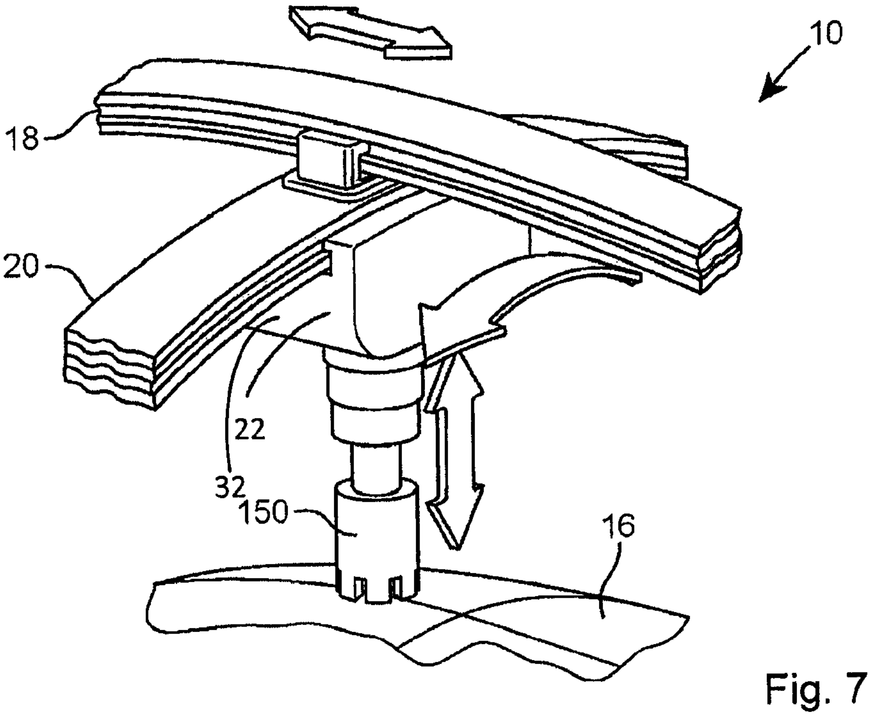
FIG. 7 shows an enlarged view of a second embodiment of hair graphic cutting apparatus, having a different cutting head.
Figure 8:
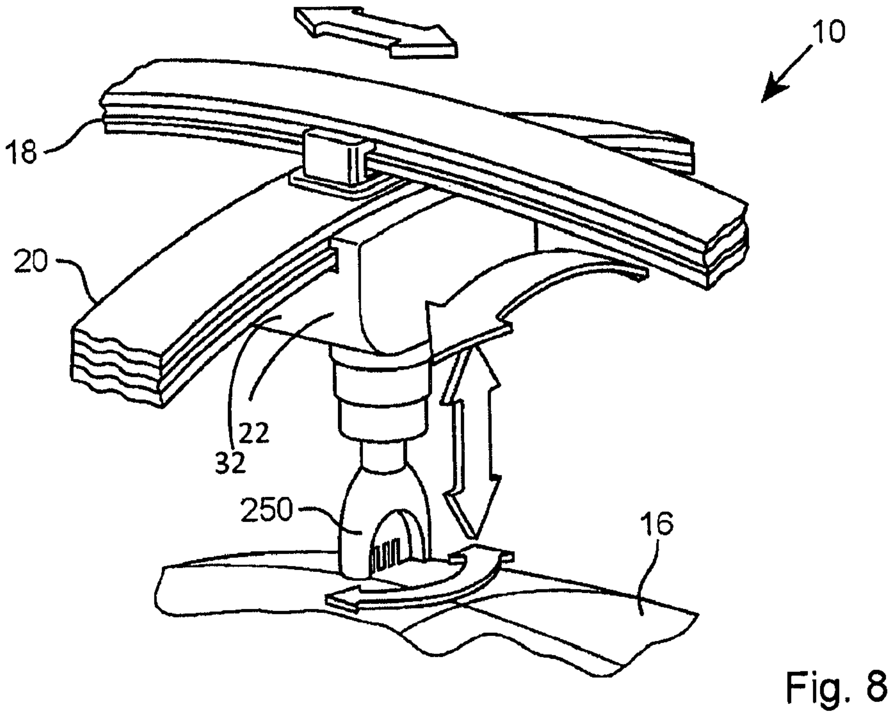
FIG. 8 shows an enlarged view of a third embodiment of hair graphic cutting apparatus, having a different cutting head.

The cutting head 50 is typically a tramliner or clipper type cutter. However, referring to FIGS. 7 and 8, the cutting head may be disengagble, allowing other types of cutting head to be attached. In the second embodiment shown in FIG. 7, a cylindrical nose-hair type cutter 150 is utilised to achieve certain graphic patterns. In the third embodiment shown in FIG. 8, an upstanding eye-brow type cutter 250 is utilised.

Although the two rails or tracks are at right angles to each other, other angles can be envisaged.

The local control circuitry may be dispensed with in favour of sole control via the main controller, or vice versa.

It is thus possible to provide hair graphic cutting apparatus which can automatically cut or shave an intricate or complex graphic design into a user's hair. The apparatus dispenses with the need of a highly skilled hairdresser, and thus the associated high cost.

The embodiments described above are provided by way of examples only, and various other modifications will be apparent to persons skilled in the art without departing from the scope of the invention, as defined by the appended claims.

What is claimed is:

1. Hair graphic cutting apparatus comprising a graphic cutting device configured to cut a graphic design, the graphic design being at least one of a distinct picture, track, emblem and logo, comprising a first track on which the graphic cutting device is motor-drivably slidably mounted, a second track on which the first track is motor-drivably slidably and transversely mounted, an electronic controller which automatically controls, based on a selected said graphic design, the movement of the graphic cutting device on the first track and the movement of the first track on the second track so that at least one of the said distinct picture, track, emblem and logo is cut into a user's hair so as to be defined at least in part by bordering hair, and so as to extend from the user's hairline or be spaced from the user's hairline, and input interface means for inputting said graphic design to the controller, the input interface means including at least one of an interne connection, an electronic memory card reader, and a peripheral device connection, wherein the controller includes an electronic memory storage device configured to store electronic movement instructions for the graphic cutting device uploaded from the input interface means.

2. Hair graphic cutting apparatus as claimed in claim 1, wherein the graphic cutting device includes a track housing and a cutter which is telescopically mounted to the track housing.

3. Hair graphic cutting apparatus as claimed in claim 2, wherein the cutter includes a gear mechanism by which a cutting head of the cutter is extendable and retractable relative to the track housing, or rotatable.

4. Hair graphic cutting apparatus as claimed in claim 1, wherein the graphic cutting device includes a plurality of selectably interchangeable cutting heads.

5. Hair graphic cutting apparatus as claimed in claim 1, wherein the graphic cutting device includes at least one pressure sensor which in use monitors a pressure imparted to a user's head by a cutting head thereof.

6. Hair graphic cutting apparatus as claimed in claim 1, further comprising a head housing having a cavity for receiving at least the rear, top and sides of a user's head, at least the second track being fixed to a surface of the cavity.

7. Hair graphic cutting apparatus as claimed in claim 6, wherein the second track extends in an anterior/posterior direction of the housing, and the first track extends in a lateral direction.

8. Hair graphic cutting apparatus as claimed in claim 6, wherein the head housing is pivotably connected to a stand.

9. Hair graphic cutting apparatus comprising a graphic cutting device, a first track on which the graphic cutting device is slidably mounted, a second track on which the first track is slidably and transversely mounted, a controller for controlling, based on a selected graphic pattern, the movement of the graphic cutting device on the first track and the movement of the first track on the second track, and input interface means for inputting designs to the controller, the input interface means including at least one of an internet connection, an electronic memory card reader, and a peripheral device connection.

10. Hair graphic cutting apparatus comprising a graphic cutting device for cutting a graphic design, the graphic design being at least one of a distinct picture, track, emblem and logo, a first track on which the graphic cutting device is motor-drivably slidably mounted, a second track on which the first track is motor-drivably slidably and transversely mounted, and an electronic controller which automatically controls, based on a selected graphic design, the movement of the graphic cutting device on the first track and the movement of the first track on the second track so that at least one of the distinct picture, track, emblem and logo is cut into a user's hair so as to be defined at least in part by bordering hair, and so as to extend from the user's hairline or be spaced from the user's hairline.

* * * * *

UNITED STATES PATENT AND TRADEMARK OFFICE

CERTIFICATE OF CORRECTION

PATENT NO. : 8,474,466 B2
APPLICATION NO. : 12/448935
DATED : July 2, 2013
INVENTOR(S) : Paul William Charles Lakin It is certified that error appears in the above-identified patent and that said Letters Patent is hereby corrected as shown below:

On the Title Page:
Item (76) the Inventor name is incorrectly spelled “Paul Willaim Charles Lakin” replace with --Paul William Charles Lakin--

Signed and Sealed this
Fifth Day of August, 2014

Michelle K. Lee
*Deputy Director of the United States Patent and Trademark Office*